(12) United States Patent
Orisses (10) Patent No.: US 11,540,564 B2
(45) Date of Patent: Jan. 3, 2023

(54) POCKET SQUARE CLOTHING ACCESSORY

(71) Applicant: Anthony Orisses, Astoria, NY (US)

(72) Inventor: Anthony Orisses, Astoria, NY (US)

(*) Notice: Subject to any disclaimer, the term of this patent is extended or adjusted under 35 U.S.C. 154(b) by 196 days.

(21) Appl. No.: 16/336,591

(22) PCT Filed: Sep. 28, 2017

(86) PCT No.: PCT/US2017/054052
§ 371 (c)(1),
(2) Date: Mar. 26, 2019

(87) PCT Pub. No.: WO2018/064355
PCT Pub. Date: Apr. 5, 2018

(65) Prior Publication Data
US 2019/0223519 A1    Jul. 25, 2019

Related U.S. Application Data

(60) Provisional application No. 62/400,839, filed on Sep. 28, 2016.

(51) Int. Cl.
*A41B 15/02* (2006.01)
*A41D 27/20* (2006.01)
(Continued)

(52) U.S. Cl.
CPC .............. *A41B 15/02* (2013.01); *A41B 15/00* (2013.01); *A41D 27/20* (2013.01); *A41D 27/201* (2013.01);
(Continued)

(58) Field of Classification Search
CPC ........ A41B 15/02; A41B 15/00; A41D 27/20; A41D 27/201; A41D 27/202;
(Continued)

(56) References Cited

U.S. PATENT DOCUMENTS 2,136,691 A * 11/1938 Jasperson ............... A41B 15/02
2/279
2,697,838 A * 12/1954 Bove ...................... A41B 15/02
2/279
(Continued)

FOREIGN PATENT DOCUMENTS

WO    2000015063 A1    3/2000
WO    2018064355 A1    4/2018

*Primary Examiner* — Khaled Annis
*Assistant Examiner* — Dakota Marin
(74) *Attorney, Agent, or Firm* — Burns & Levinson LLP; Rebecca C. Christon (57) ABSTRACT

Techniques are disclosed for producing a pocket square. The pocket square may include a single layer or may include multiple layers. In some embodiments, the pocket square may include a first layer having a length and width. The first layer may be attached to a second layer configured to have the same length and width as the first layer. Disposed between the first layer and the second layer there may be a third layer configured to maintain a desired shape of the pocket square. In some embodiments, the third layer comprises at least one of: a polymeric material, a non-polymeric material, a metallic mesh, a metallic foil, a woven fabric, a non-woven fabric, and/or a fabric infiltrated with a polymer.

16 Claims, 7 Drawing Sheets

(51) Int. Cl.
  *A41B 15/00* (2006.01)
  *B32B 5/26* (2006.01)
  *B32B 7/12* (2006.01)
  *B32B 15/14* (2006.01)

(52) U.S. Cl.
  CPC .......... *A41D 27/202* (2013.01); *A41D 27/204* (2013.01); *A41D 27/205* (2013.01); *A41D 27/207* (2013.01); *A41D 27/208* (2013.01); *B32B 5/26* (2013.01); *B32B 7/12* (2013.01); *B32B 15/14* (2013.01); *B32B 2437/00* (2013.01)

(58) Field of Classification Search
  CPC .. A41D 27/204; A41D 27/205; A41D 27/207; A41D 27/208
  USPC .............................................................. 2/279
  See application file for complete search history.

(56) References Cited

U.S. PATENT DOCUMENTS

| | | | | |
|---|---|---|---|---|
| 5,231,702 A * | 8/1993 | Masters | ................. | A41B 15/02 2/244 |
| 6,612,433 B2 * | 9/2003 | McKenzie | ............ | B65D 75/14 206/308.1 |
| 6,692,812 B1 * | 2/2004 | Watanabe | ................. | A45C 3/001 428/138 |
| 8,418,267 B2 * | 4/2013 | Shaw | ..................... | A41D 27/20 2/247 |
| 8,931,115 B1 * | 1/2015 | Bonham | ................ | A41D 25/16 2/144 |
| 9,051,681 B1 | 6/2015 | Costa | | |
| 9,516,903 B1 * | 12/2016 | Gambuzza | ............ | A41B 15/02 |
| 10,334,922 B2 * | 7/2019 | Ellis | ......................... | A45C 1/02 |
| 2003/0041367 A1 * | 3/2003 | Hadden | ................ | D03D 15/593 2/195.5 |
| 2003/0236044 A1 * | 12/2003 | Nissim | ................. | A41D 31/065 442/131 |
| 2004/0110443 A1 * | 6/2004 | Pelham, Sr. | ............. | B32B 5/12 442/400 |
| 2008/0280737 A1 * | 11/2008 | Cook | ................... | A63B 21/065 482/105 |
| 2009/0260395 A1 * | 10/2009 | Coleman | ................... | A44C 1/00 63/20 |
| 2013/0017760 A1 * | 1/2013 | Kadium | ............. | A41D 13/1245 450/30 |
| 2014/0004295 A1 * | 1/2014 | Kiederle | ............. | A41D 31/085 428/101 |
| 2015/0157059 A1 * | 6/2015 | Muratore, II | .......... | A41B 15/02 2/279 |
| 2015/0189935 A1 * | 7/2015 | Rosenhaus | ........... | A41D 27/207 2/74 |
| 2016/0073715 A1 | 3/2016 | Fayed et al. | | |
| 2016/0120234 A1 * | 5/2016 | Cobb | ..................... | A41B 15/02 2/250 |
| 2016/0120245 A1 | 5/2016 | Novela | | |
| 2016/0157526 A1 * | 6/2016 | Adeniji | ................. | A41B 15/02 2/279 |

* cited by examiner

POCKET SQUARE CLOTHING ACCESSORY

FIELD OF THE DISCLOSURE

This disclosure relates to clothing articles, and more particularly to a pocket square that is configured to maintain a folded or otherwise manipulated shape.

BACKGROUND

Fashion allows a person to express their personality or ideas through an individual's appearance. Formal attire, such as a suit or sport jacket, however, limits the ability for personal expression. Moreover, societal expectations may not permit one to express a personal sense of style or taste. Accessories, such as pocket squares, allow individuals to express a sense of style or personality while satisfying societal norms. With numerous colors and patterns choices available, pocket squares have increasingly become a preferred manner for accenting formal dress fashion to express one's style and/or personality. In some societal circles, accenting one's formal appearance with a pocket square indicates a sense of fashion or social standing.

SUMMARY

Some example embodiments of the present disclosure provide a pocket square including a first layer having a size and shape, a second layer attached to the first layer, the second layer having a size and shape approximately equal to that of the first layer, and a third layer disposed between the first layer and the second layer, wherein the third layer is configured to maintain a desired shape of the pocket square. In some such embodiments, the third layer is made from a polymeric material, a non-polymeric material, a metallic mesh, a metallic foil, a woven or non-woven fabric, or a fabric infiltrated with a polymer. In other example embodiments, the disclosed pocket square has a single layer that is treated to provide a level of rigidity to the material while also maintaining its malleability.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Techniques and configurations are disclosed for producing pocket squares that can be easily folded and yet maintain a folded shape when placed in a jacket or coat pocket. The pocket square may, in some embodiments, include a first layer having a size and a shape. The first layer may be attached to a second layer with a joint, in some embodiments. In some embodiments, the first layer and the second layer are distinct fabrics. The second layer can be configured to have a length and width approximately equal to the length and width of the first layer. In some embodiments, the joint joining the first layer and the second layer may be stitching and/or an adhesive. Disposed between the first layer and the second layer there may be a malleable, yet strong, third layer. In some embodiments, the third layer may be a thin deformable layer that allows the pocket square to appear as a conventional single layer pocket square when folded or otherwise manipulated. The third layer can provide strength and rigidity, such that the pocket square is able to maintain a particular shape when placed in a pocket of a garment. In some embodiments, the third layer is a mesh formed of a plurality of metallic wires.

In some disclosed embodiments, the disclosed pocket square may be formed of a single layer. For example, in some particular embodiments, a woven or non-woven fabric may be treated with one or more treatment agents to provide a material capable of being malleable yet also possessing mechanical properties to maintain the pocket square in a folded or otherwise manipulated shape. Numerous configurations and variations will be apparent in light of the subject disclosure.

General Overview

A pocket square is typically placed or otherwise positioned in a pocket of a suit coat or sport jacket by neatly folding the pocket square to fit the pocket to create a desired appearance. Folding pocket squares, however, can be challenging because conventional pocket square materials, such as cotton, silk and linen, do not easily maintain their folded shape. Thus, when an individual is configuring a conventional pocket square using a multiple fold technique, as is commonly done, the pocket square can move, causing the previous folds to become undone or otherwise misshaped. As a result, the pocket square is folded incorrectly or sloppily.

While in use, pocket squares tend to shift or move, such that the pocket square no longer accents the clothing article as intended. Movements, for example, walking or donning a coat or jacket, may cause the pocket square to fall within the pocket and thus, appear less visible or improperly positioned within the pocket. In some cases, movement of the pocket square is caused by the pocket square lacking sufficient strength and/or rigidity to maintain its folded shape. Other known devices created to support or otherwise hold a pocket square in place within a pocket do not adequately solve this problem. For example, these devices are generally bulky and/or large in size and thus, can produce a bulge in the coat pocket or otherwise cause the pocket to appear irregularly shaped when the device is positioned therein. Pocket square holders can also be cumbersome to use because these devices typically require operation or manipulation of multiple components to install a pocket square in the device. Additionally, pocket square holders limit folding options for creating different fashionable appearances due to the limited amount of pocket square material that can be held within the device. Moreover, pocket square holders can also cause pocket squares to appear stiff and unnatural.

Thus, and in accordance with embodiments of the present disclosure, single layered and multi-layered pocket squares are disclosed. The disclosed pocket squares may include, in some embodiments, a first layer having a size and a shape. The first layer, in some embodiments, may have a square shape. Other shapes and sizes for the first layer may depend on the particular application (e.g., the size of the jacket or coat pocket) and will be apparent in light of this disclosure. The first layer may also include a pattern and/or color for accenting a garment, such as a jacket, coat or vest.

In example embodiments having a single layer, the single layer of the pocket square may be any material described herein with respect to the first layer as described herein. For example, in embodiments that include a single layer, the layer may be a woven or a non-woven fabric. In some cases, the single layer may be treated with one or more treatment agents to provide a material capable of being malleable yet also possessing rigidity. In some embodiments, the treatment agent used to treat the fabric layer may be a polymeric material, including natural or synthetic polymers, such as starch, polyethylene, polyvinyl acetate rubber, wax, or other suitable polymers. In some embodiments where a polymeric treatment agent is applied to the fabric layer, the polymer may be deposited on the fabric as a thin film or the fabric may be exposed to a solution containing the polymer.

In multi-layered embodiments, the first layer may be attached to a second layer. In some embodiments, the second layer is configured to have a size and shape that are approximately equal to the size and shape of the first layer. In many embodiments, the first layer and the second layer comprise, consist of, or consist essentially of a fabric (e.g., cotton, linen, or silk). The second layer may include the same pattern and/or color as the first layer or a different pattern and/or color. Having different colors and/or patterns for the first and second layers may provide a user with different options for displaying or otherwise accenting a coat or jacket.

The first layer and second layer may be attached or otherwise joined together using any suitable method, such as stitching and/or applying adhesive. In some cases, a joint may be formed at the intersection of the first layer and the second layer, for example, along the perimeter of the pocket square. The joint may be a visible joint, such as stitching. In other embodiments, however, the joint may not be visibly apparent, such as an adhesive positioned between layers of the pocket square. In some embodiments, more than one joint may be used to join the first layer and the second layer together. For example, in some cases, both adhesive and stitching can be used to join the first and second layers. In some instances, a middle (or third) layer may also be attached to the first and second layers at the joint. In other instances, however, the third layer may be attached to one and/or both first and second layers independent from the joint that attaches first layer to the second layer.

Disposed between the first layer and the second layer there may be a malleable, yet strong, third layer. The third layer may be a thin deformable layer that gives the pocket square the appearance of a conventional single layer pocket square (i.e., a natural fabric look) when folded. As previously described, conventional single layered pocket squares typically are difficult to fold and lose their shape and thus, appear misshaped or disheveled when placed in a garment pocket. The third layer, however, can provide strength and rigidity, such that the pocket square is easier to fold and maintains its folded shape when placed in a pocket and during use. The third layer may be made from one or more materials, such as: a polymeric material, a non-polymeric material, a metallic mesh, a metallic foil, a woven fabric, a non-woven fabric, and/or a fabric infiltrated with a polymer.

The third layer may be approximately the same size and shape as the first and second layers. In other instances, however, the third layer may have a different size and/or shape than the first and second layers. For example, in some cases, the third layer may have a slightly smaller size (e.g., length and width) than the first layer and the second layer.

Example Pocket Square Assembly

Figure 1:
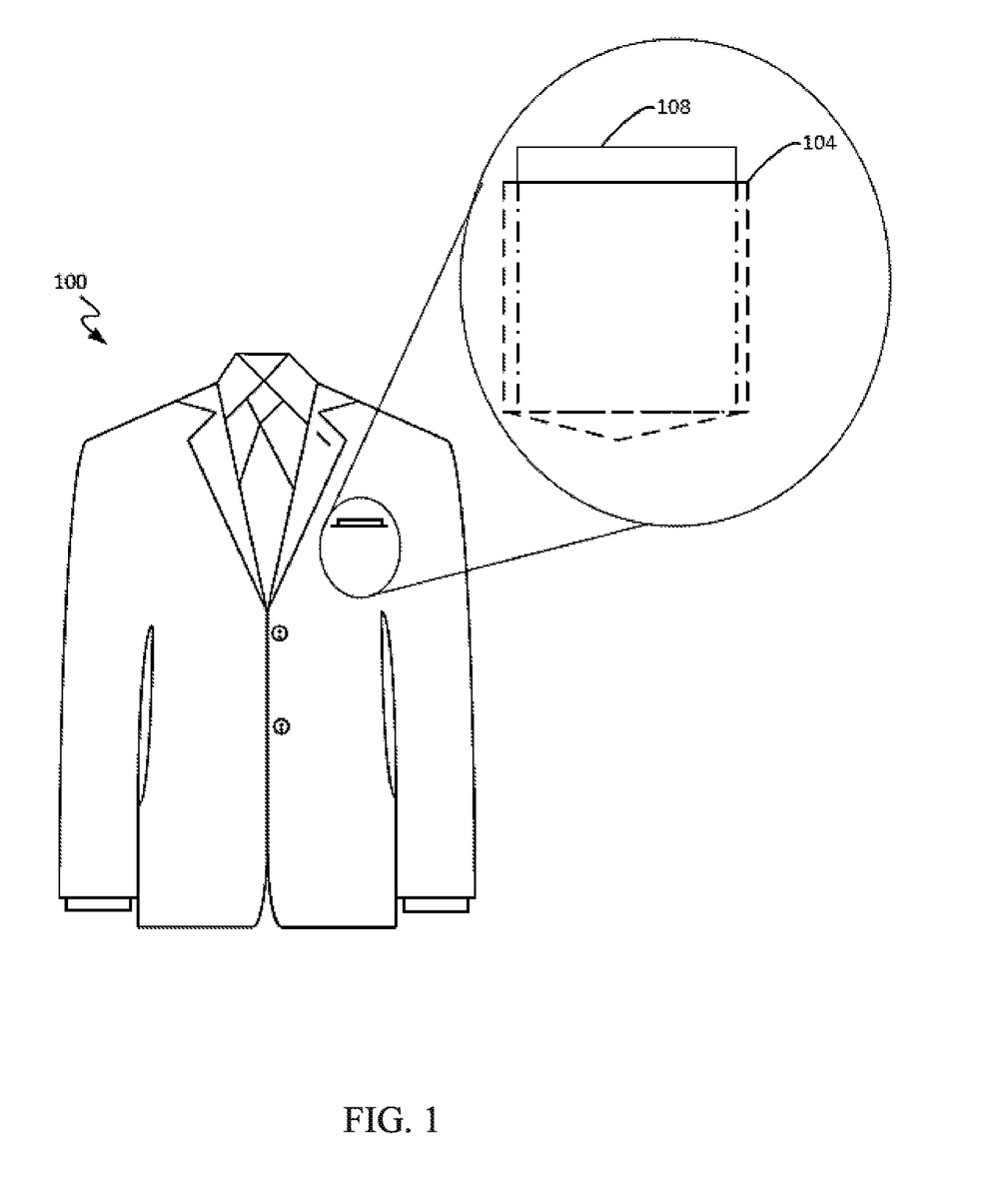
FIG. 1 is a schematic view of a coat with a pocket square configured in accordance with an embodiment of the present disclosure.

FIG. 1 is a schematic view of a coat with a pocket square configured in accordance with an embodiment of the present disclosure. The coat 100 may be part of a suit or tuxedo or may be a singular clothing garment, such as a sport jacket, that can be combined with other clothing articles to achieve a desired look or appearance. In other instances, the coat 100 may be a waist coat (i.e., a vest). As shown in FIG. 1, coat 100 includes a pocket 104 with a pocket square 108 positioned therein.

Coat 100 may include a pocket 104 positioned on its front for improving the aesthetics of a garment and/or providing functionality, including storage. As can be seen, the pocket 104 may be located on the front of coat 100 adjacent to one of the lapels (e.g., the left lapel). In some instances, the pocket 104 is configured to match or compliment the appearance of other parts of the coat 100, such as other pockets or the lapel. In some embodiments, the pocket 104 has a width between 3 to 4 inches and a depth of between 3 to 5 inches. In other instances, however, the width and depth of the pocket 104 may vary depending on the design or size of the coat 100. The pocket 104 may include a pocket square 108 for accenting the coat 100 to achieve a desired look or appearance. To install the pocket square 108, the pocket square 108 may be folded or otherwise manipulated to achieve: (1) a shape that can be installed into the pocket 104 and/or (2) a particular appearance when installed.

Figure 2:
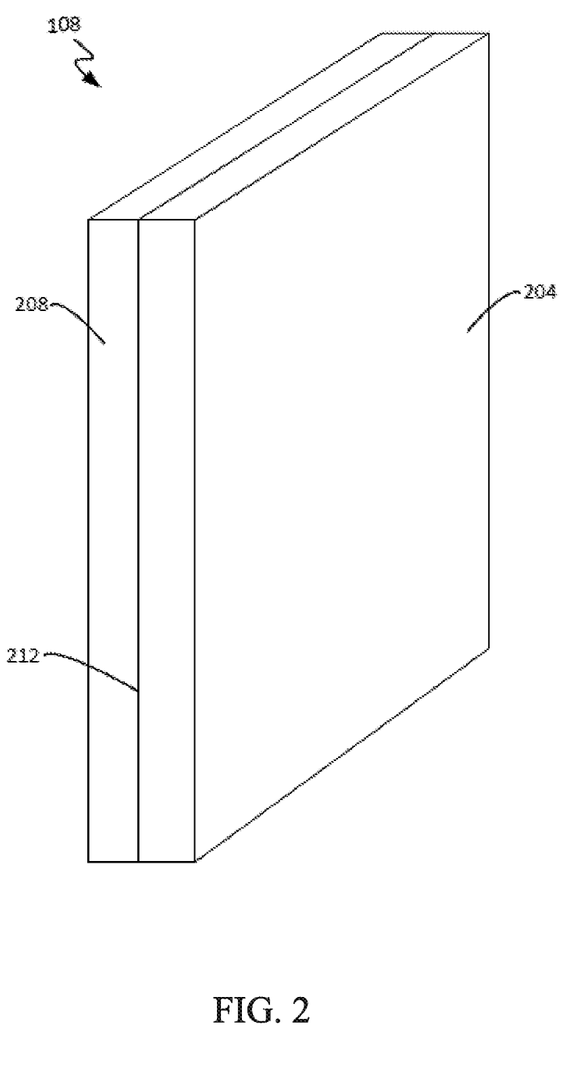
FIG. 2 is a perspective view of a pocket square configured in accordance with an embodiment of the present disclosure.

FIG. 2 is a perspective view of a multi-layered pocket square configured in accordance with an embodiment of the present disclosure. The multi-layered pocket square 108, hereinafter generally referred to as pocket square 108, includes a first layer 204, a middle layer (not shown), a second layer 208, and a joint 212. In some cases, the pocket square 108 is configured in the shape of a square, as shown in FIG. 2. In other instances, however, the pocket square 108 may be in the shape of a rectangle. In a more general sense, pocket square 108 can be any one of a number of shapes, so long as the pocket square 108 can be properly installed within a pocket. The pocket square 108 may have a range of sizes (e.g., length, width, and thickness) based on several factors, such as the size of the coat pocket, thickness of the pocket square material, and/or desired thickness of the pocket square. In some embodiments, pocket square 108 may be square shaped and may have a width between 10 inches and 17 inches, such as between 11 inches and 15 inches, approximately 12 inches, approximately 13 inches, or approximately 14 inches. In other example embodiments however, pocket square 108 may have a rectangular shape and may have a length of between 8 inches and 18 inches and a width of between 6 and 18 inches. In some specific embodiments, pocket square 108 may have a length and a width of approximately 14 and 12 inches, respectively. Other possible sizes will be readily apparent in light of the present disclosure.

The pocket square 108 includes a first layer 204 for displaying a color and/or pattern to accent the appearance of the coat 100. The first layer 204 may be made from a number of woven or non-woven materials, such as cotton, silk, satin, velvet, or linen. In some embodiments, first layer 204 may feature a pattern or one or more colors while in other embodiments, first layer 204 may not be patterned. First layer 204 may have any desired thickness, such as less than 0.5 cm, less than 0.4 cm, less than 0.3 cm, less than 0.2 cm, or less than 0.1 cm. In these and other embodiments, first layer 204 may have a size (e.g., a length and a width) that are equal to or approximately equal to the size of pocket square 108.

In addition to first layer 204, in some embodiments, pocket square 108 may also include a second layer 208 that when joined or otherwise attached to first layer 204 covers the middle layer (as described below). The length and width of the second layer 208 may be approximately equal to the length and width of the first layer 204, such that either layer can be displayed without exposing the other. Second layer 208 may be manufactured from any materials identified with respect to first layer 204, including but not limited to cotton, silk, or linen. In some example embodiments, first layer 204 and second layer 208 may be formed of the same type of material while in other embodiments, first layer 204 and second layer 208 may be formed of different types of material. Additionally, in some example embodiments, first layer 204 and second layer 208 may feature the same pattern or may each lack a pattern, while in other embodiments, first layer 204 and second layer 208 may feature different patterns or one of the layers may be patterned while the other layer is not patterned.

In some embodiments, first layer 204 and second layer 208 may be joined together at joint 212, as shown in FIG. 2. In accordance with such example embodiments, joint 212 may be a woven seam comprising one or more stitches that connect first layer 204 and second layer 208 together along a perimeter of each layer. In other embodiments, however, first layer 204 and second layer 208 may be joined together using other materials, such as adhesives (including glue and/or epoxy) or other suitable techniques. In a more general sense, joint 212 can be any material that can maintain the first layer 204 and second layer 208 together while folding or otherwise manipulating the pocket square 108.

Figure 3:
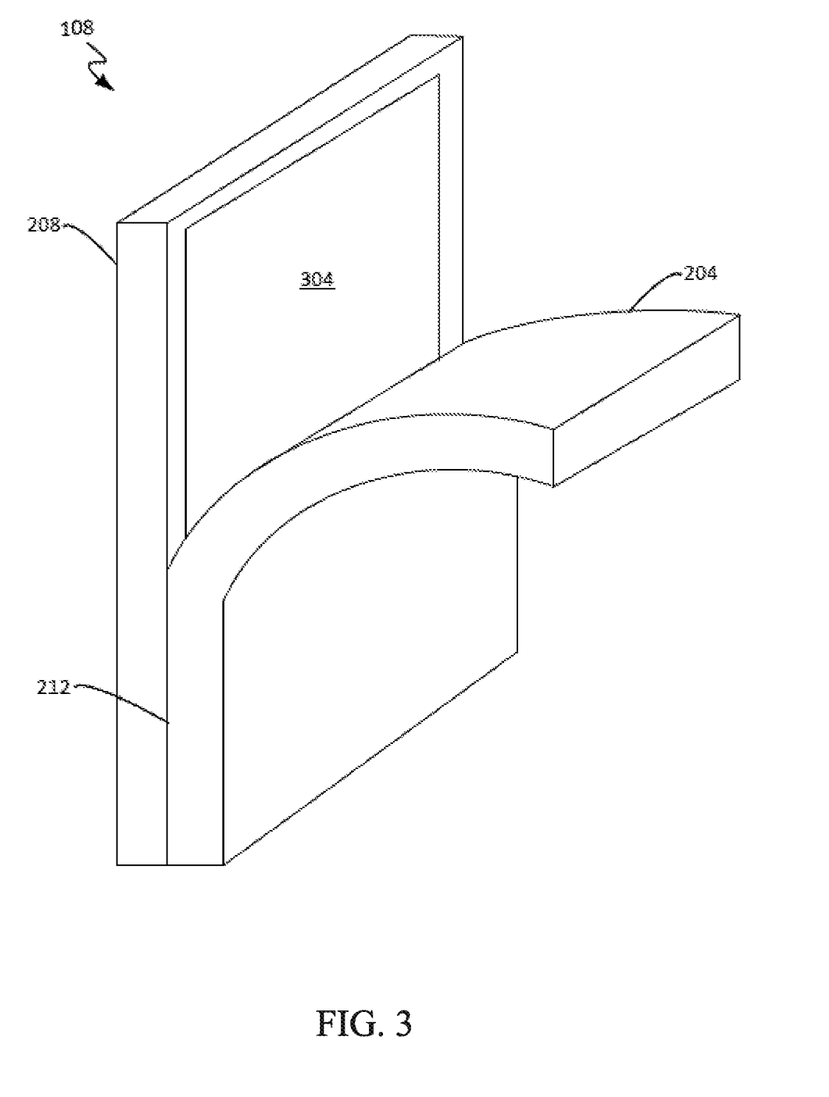
FIG. 3 is a cut-away view of a pocket square illustrating first, second, and third layers configured in accordance with an embodiment of the present disclosure.
Figure 4:
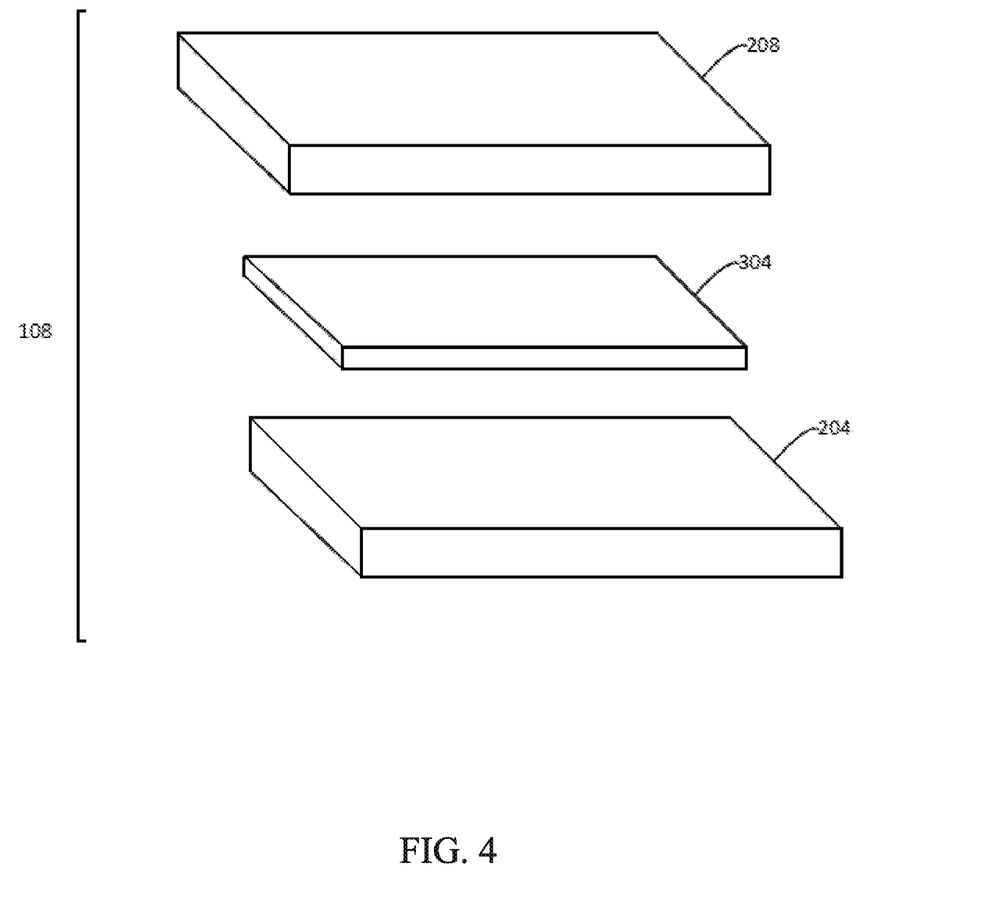
FIG. 4 is an exploded view of the pocket square shown in FIG. 3.

FIG. 3 is a cut-away view of a pocket square illustrating a third layer 304 configured in accordance with an embodiment of the present disclosure. FIG. 4 is an exploded view of the multi-layered pocket square shown in FIG. 3. As can be seen, the third layer 304 is positioned between the first layer 204 and the second layer 208. In some embodiments, third layer 304 may be in direct contact with both first layer 204 and second layer 208. The third layer 304 may have approximately the same dimensions (i.e., length and width) as layers 204 and 208. However, as shown in FIG. 4, third layer 304 may have a length and a width that are slightly smaller than first layer 204 and second layer 208. For example, third layer 304 may have a length and/or width that is at least 20%, 10%, 5%, or 1% less than the length and/or width of the first layer or second layer. With all the layers having similar dimensions, the third layer 304 can be easily joined to the first layer 204 and/or second layer 208 (e.g., with stitching and/or adhesive). In other instances, however, the third layer 304 may be a different shape and/or size than first layer 204 and/or second layer 208. For example, third layer 304, may have a diamond shape, which may allow the pocket square 108 to be folded in different configurations. In embodiments where third layer 304 has a different size or shape than first layer 204 and second layer 208 (e.g., slightly smaller), the third layer 304 may not be seen and thus, may not affect the appearance of the pocket square 108 when installed. Third layer 304, for instance, may be slightly smaller than the layers 204 and 208, in some embodiments, such that third layer 304 is not exposed at any point along the perimeter of pocket square 108.

Third layer 304 may be manufactured from a rigid, yet deformable material, such that the pocket square 108 maintains a desired shape (e.g., folded at one end) and position within the pocket (e.g., one end exposed from coat pocket). Third layer 304 may be formed of a polymeric or a non-polymeric material. In some example embodiments, third layer 304 may be an extruded or coextruded polymeric film. Example polymeric materials include but are not limited to polyethylene (including low density polyethylene, high density polyethylene and/or cross-linked polyethylene), polypropylene, rubber (including natural or synthetic rubbers), or other suitable polymers. In some embodiments, third layer 304 may comprise a thermoplastic material that is deformable, yet capable of maintaining the pocket square 108 in a folded configuration. For example, in some embodiments where third layer 304 includes a thermoplastic material, pocket square 108 may be deformable or otherwise malleable when heat from an iron, hair dryer, warm water and/or hot water is applied. Thus, during the application of heat, the pocket square 108 may be easily folded or otherwise configured for placement in a coat pocket. With the heat no longer applied, however, the third layer 304 may become rigid to maintain the first layer 204, second layer 208, and third layer 304 in a specific shape and/or folded configuration.

In some example embodiments, third layer 304 may comprise a woven or a non-woven material or fabric. In some such example embodiments, third layer 304 may comprise a fabric, including felt or any fabric discussed with respect to first layer 204 and second layer 208. In embodiments where third layer 304 includes a woven or a non-woven fabric, the fabric may be infiltrated with a polymer. For example, in some example embodiments a thin fabric (e.g., cotton or linen) may be infiltrated with a polymer (e.g., polyethylene). In these example embodiments, a thermoplastic material, such as a low temperature thermoplastic material, may be applied to the fabric. However, in other embodiments, other types of polymeric materials may be used. In these and other embodiments, a fabric may be loosely woven in a grid pattern and may then be coated with polymeric material. In other embodiments, a thermoplastic heat moldable foam, such as NICKELPLAST LITE™, for example, may be included in third layer 304. In some particular example embodiments, third layer 304 may include KOBRACAST® (knitted polyester fabric combined with a thermoplastic), FOSSHAPE™ (non-woven fabric comprising low-melt polyester fibers) and/or WONDERFLEX™ materials.

Figure 5:
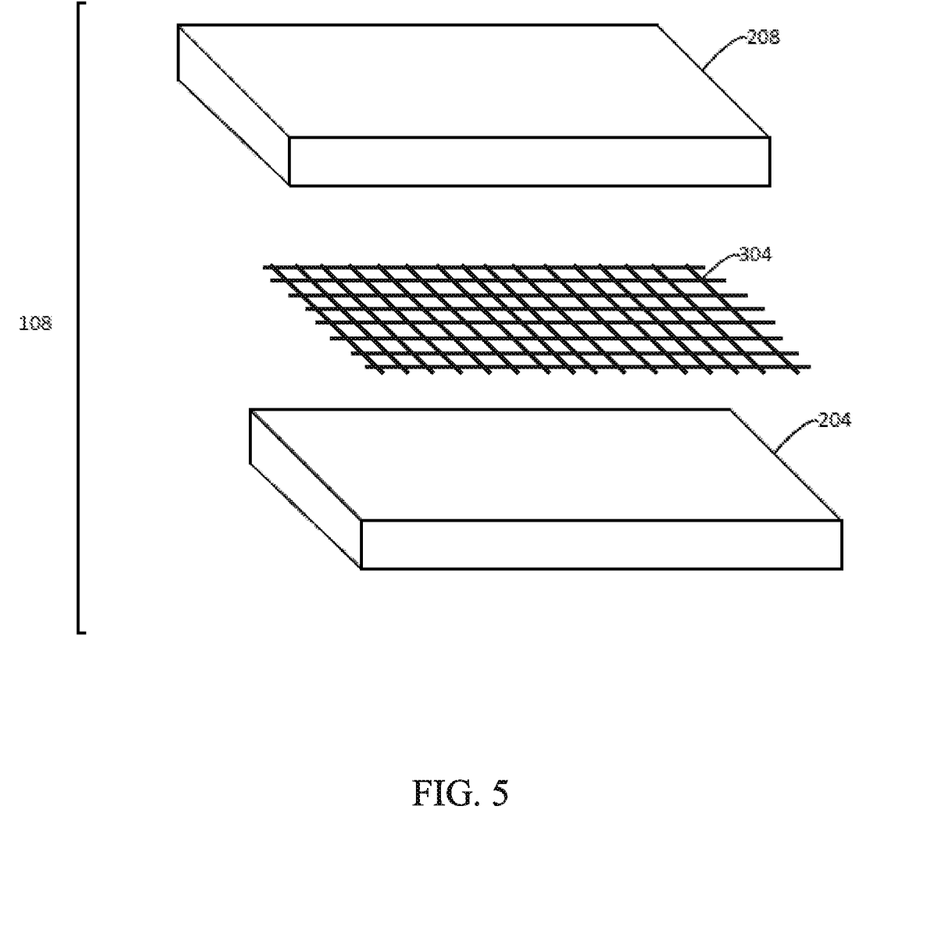
FIG. 5 is an exploded view of a pocket square configured in accordance with an embodiment of the subject disclosure.

In some embodiments, third layer 304 may comprise a metallic material, such as a metallic mesh or metallic foil. In particular embodiments, third layer 304 comprises a metallic mesh formed of a plurality of metallic wires. FIG. 5 shows an example pocket square 108 in which third layer 304 is a metallic mesh formed of a plurality of metallic wires. In some such embodiments, the metallic wires may have a diameter of 0.005 cm to 0.15 cm. For example, the metallic wires of the metallic mesh of third layer 304 may have a diameter of between 0.01 cm and 0.1 cm, in some embodiments. In these and other embodiments, the metallic mesh of third layer 304 may have between 4 wires per 2.54 cm and 100 wires per 2.54 cm (i.e., 4 wires per inch to 100 wires per inch). For example, in some cases, the metallic mesh of third layer 304 may have between 10 wires per 2.54 cm and 50 wires per 2.54 cm. In embodiments where third layer 304 is formed of a metallic mesh, the metallic mesh may comprise copper, aluminum, titanium, stainless steel, gold, and/or silver. In select embodiments, the metallic mesh is formed of an alloy comprising at least two distinct metals, while in other embodiments, the metallic mesh is formed of a single metal having a purity of at least 95%. In some cases, copper having a purity of at least 99.7% is used to form the metallic mesh of the third layer 304. However, other suitable metals or materials may be used. In a more general sense, any material can be used to manufacture the layer 304, so long as the layer 304 is deformable and capable maintaining its shape. Numerous configurations and variations will be apparent to those skilled in the art upon consideration of the subject disclosure.

To prevent the pocket square 108 from having an undesirable appearance when installed (e.g., creating bulge within the pocket), the third layer 304 may be relatively thin. For example, third layer 304 may have a thickness from 0.01 to 0.8 cm, such as between 0.03 and 0.3 cm. In some instances, third layer 304 may include a coating, such as an adhesion promoter, for ease of assembly with the other pocket square components. In accordance with some example embodiments, the thickness of the third layer 304 may be made as thin as possible to allow the pocket square to function, while simultaneously providing sufficient strength to resist wear caused by repeated folding or manipulating of the pocket square 108.

In addition to being relatively thin, third layer 304 may also be relatively light weight, such that the pocket square is not overly heavy when worn and does not cause the pocket square 108 to fall under its own weight. In some embodiments, third layer 304 may be implemented with one or more materials described above that are lightweight yet also provide sufficient strength to maintain the pocket square 108 in a folded shape. For instance, in some particular embodiments, a pocket square as disclosed herein may have a total weight of less than 100 g, less than 90 g, less than 80 g, less than 70 g, less than 60 g, less than 50 g, less than 40 g, less than 30 g, less than 20 g, less than 10 g, less than 8 g, less than 6 g, less than 4 g, less than 2 g, less than 1 g, or less than 0.5 g.

The disclosed pocket squares can be produced by any suitable method. For example, in some embodiments, a pocket square in accordance with the subject disclosure may be produced by forming a first layer and a second layer. Any material may be used to form the first layer and the second layer, such as the materials previously discussed with respect to first layer 204 and second layer 208. Similarly, first layer and second layer may have any dimension previously discussed. In some cases, the length of the second layer may approximately equal to the length of the first layer and the width of the second layer may be approximately equal to the width of the first layer. In these and other embodiments, a third layer may be positioned between the first layer and the second layer. The third layer may have any desired dimensions, such as those previously discussed with respect to third layer 304. Additionally, the third layer may be formed of any material discussed with respect to third layer 304. In select embodiments, the length of the third layer may be less than the length of the first layer and the width of the third layer may be less than the width of the first layer.

In some embodiments, the third layer is adhered to at least one of the first layer and the second layer. In some embodiments, a polymeric adhesive is used to adhere the third layer to the first layer and/or second layer. In some such embodiments, any suitable polymeric adhesive may be used, such as a water-based adhesive or a non-aqueous adhesive. In some embodiments, the polymeric adhesive may be selected from the following group: a vinyl acetate (for example, polyvinyl acetate), an acrylate, or a urethane. In some embodiments, the adhesive may be a pressure sensitive adhesive or a heat-sensitive adhesive. The adhesive may be applied by any desired technique, such as by spraying, dipping, rolling, and/or brushing. After adhesive is applied, the third layer and the first layer and/or the second layer may be pressed together with or without applying heat. The first layer may then be adhered to the second layer with any adhesive (for example, a polymeric adhesive) and/or with stitching.

Figure 6A:
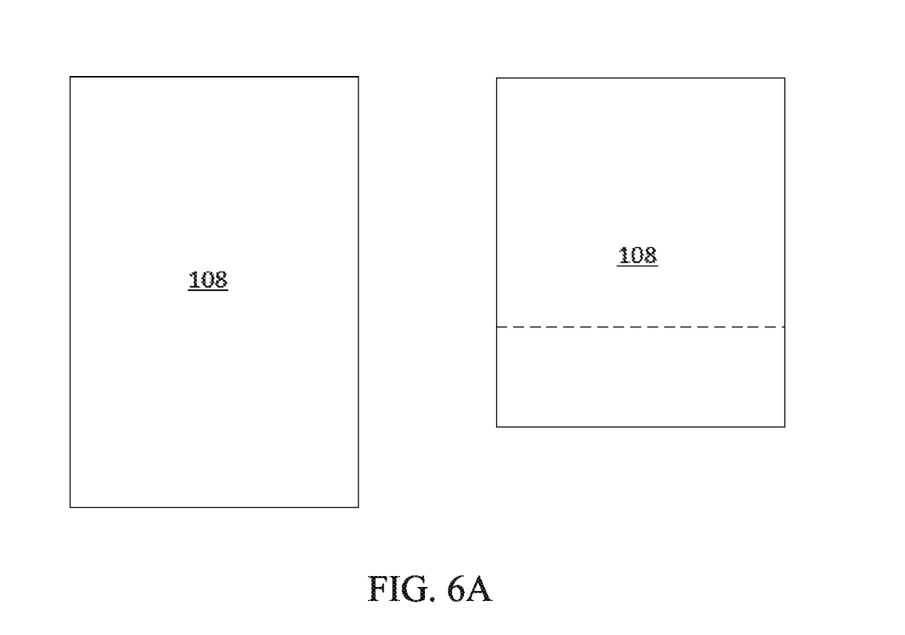
FIGS. 6A-6D are schematic views of an exemplary pocket square illustrating different pocket square configurations, in accordance with various embodiments of the present disclosure.
Figure 6B:
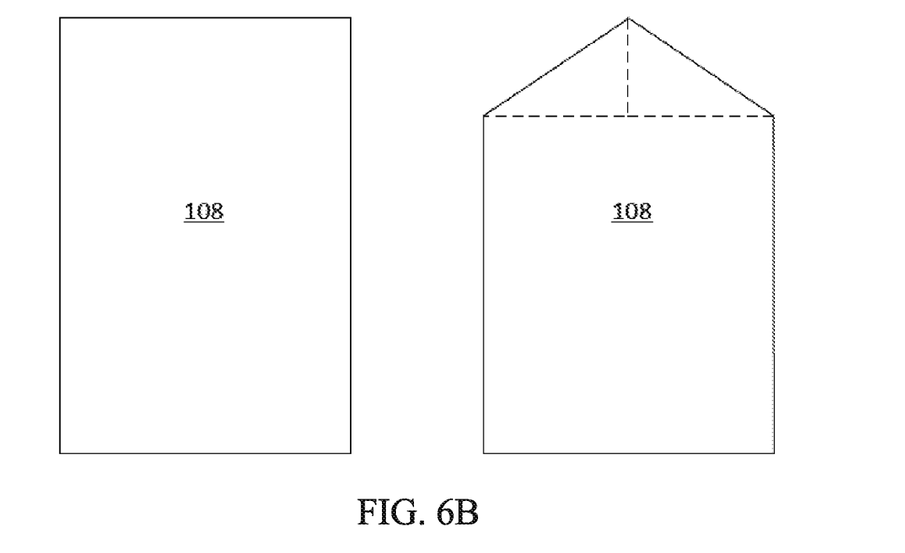
Figure 6C:
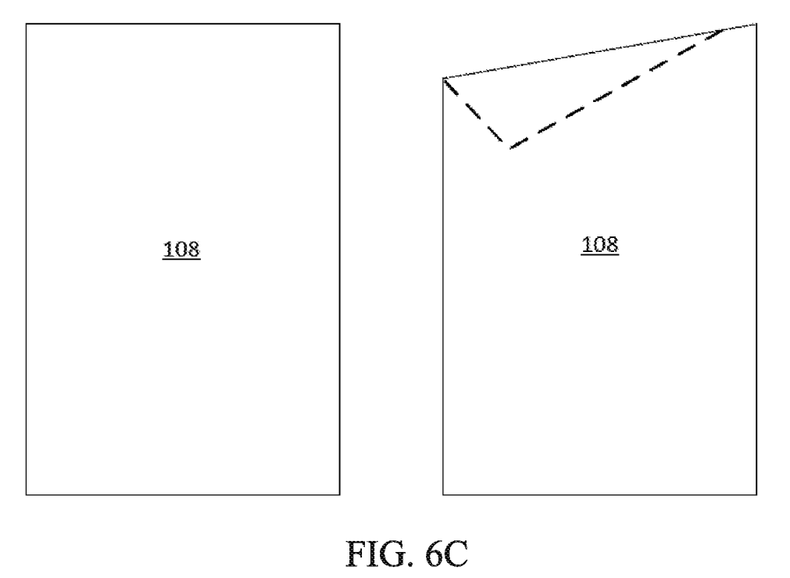
Figure 6D:
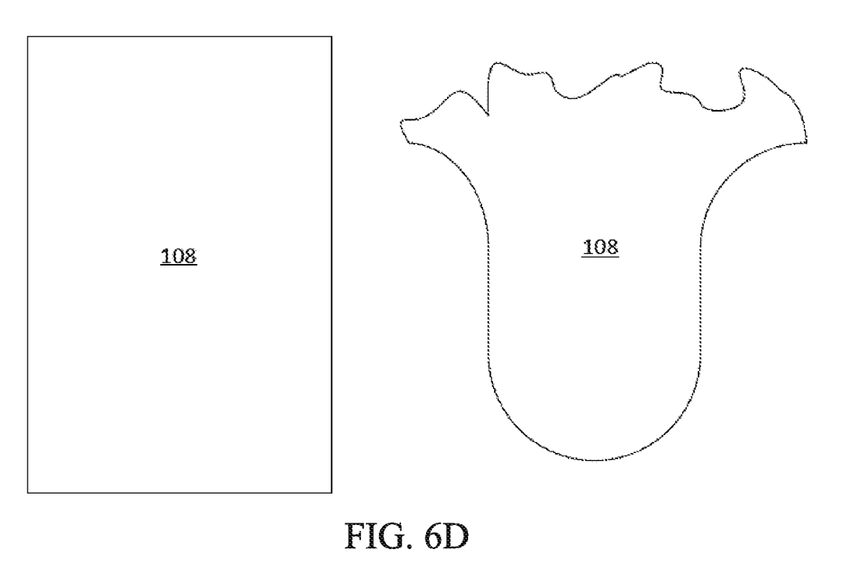

The pocket square 108 can be manipulated in a number of ways. A few sample arrangements of pocket square 108 are illustrated in FIGS. 6A-6D. For example, in FIG. 6A, a lower portion of the pocket square 108 is folded back to reduce the overall length of the pocket square, such that a proper amount of the pocket square 108 is exposed from the pocket. In other instances, a top portion of the pocket square 108 can be manipulated to achieve different styles. This is illustrated in FIGS. 6B and 6C, in which the top portion of the pocket square 108 is folded down to achieve a tapered or pointed look. In other cases, an individual may prefer a less formal look or otherwise prefer not to spend time folding the pocket square 108. In such cases, the individual can simply bunch or otherwise stuff the pocket square 108 into the coat or jacket pocket. An example of such a configuration is illustrated in FIG. 6D, in which the pocket square 108 is manipulated to provide a puff or wavy appearance protruding from the pocket. In a more general sense, note that the pocket square 108 can be manipulated in any number of ways to achieve one of several appearances when installed within a coat or jacket pocket. In some instances, the pocket square 108 may be stored in a desired folded configuration. Storing a previously-folded pocket square in a desired configuration can save time and energy, because individuals do not have to refold the pocket square 108 for each individual use.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter. Additionally, the foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A pocket square comprising:
   a first layer having a length and a width;
   a second layer attached to the first layer, the second layer having a length approximately equal to the length of the first layer and a width equal to the width of the first layer, wherein the first layer and the second layer are distinct layers; and
   a third layer disposed between the first layer and the second layer, the third layer having a length equal to the length of the first layer and the second layer, the third layer also having a width equal to the width of the first layer and the second layer, wherein the third layer comprises a metallic mesh having between 10 wires per 2.54 cm and 50 wires per 2.54 cm extending along at least one of the length and the width of the third layer, and the pocket square is in the shape of a square or a rectangle.

2. The pocket square of claim 1, wherein the first layer and the second layer each consist essentially of a fabric.

3. The pocket square of claim 2, wherein the fabric is selected from the group consisting of: cotton, silk, satin, velvet, and linen.

4. The pocket square of claim 1, wherein the first layer and the second layer are each formed of a woven or a non-woven material.

5. The pocket square of claim 1, wherein the third layer is in direct contact with both the first layer and the second layer.

6. The pocket square of claim 1, wherein the metallic mesh is formed of a plurality of metallic wires.

7. The pocket square of claim 6, wherein the metallic wires each have a diameter of between 0.005 cm and 0.15 cm.

8. The pocket square of claim 7, wherein the metallic wires each have a diameter of between 0.01 cm and 0.1 cm.

9. The pocket square of claim 6, wherein the metallic wires comprise at least one of: copper, aluminum, titanium, stainless steel, gold, and silver.

10. The pocket square of claim 9, wherein the metallic wires are formed of copper having a purity of at least 95%.

11. The pocket square of claim 10, wherein the copper has a purity of at least 99.7%.

12. The pocket square of claim 6, wherein the third layer has a thickness of between 0.01 and 0.8 cm.

13. The pocket square of claim 12, wherein the third layer has a thickness of between 0.03 and 0.3 cm.

14. The pocket square of claim 1, wherein the pocket square has a total weight of less than 100 g.

15. The pocket square of claim 14, wherein the pocket square has a total weight of less than 20 g.

16. The pocket square of claim 1, wherein the third layer is attached to at least one of the first layer and the second layer with an adhesive.

* * * * *